US012798662B2

(12) United States Patent
Lee et al.

(10) Patent No.: US 12,798,662 B2
(45) Date of Patent: Nov. 17, 2026

(54) MOTOR-DRIVEN POWER STEERING DEVICE, METHOD FOR CONTROLLING THE SAME, AND VEHICLE HAVING THE SAME

(71) Applicant: HL Mando Corporation, Pyeongtaek-si (KR)

(72) Inventors: Su Min Lee, Pyeongtaek-si (KR); Beom Hee Jang, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 67 days.

(21) Appl. No.: 18/935,830

(22) Filed: Nov. 4, 2024

(65) Prior Publication Data

US 2026/0035031 A1 Feb. 5, 2026

(30) Foreign Application Priority Data

Jul. 30, 2024 (KR) ........................ 10-2024-0100946

(51) Int. Cl.
*B62D 5/04* (2006.01)
*B62D 6/00* (2006.01)
*B62D 15/02* (2006.01)

(52) U.S. Cl.
CPC ............... *B62D 5/046* (2013.01); *B62D 6/00* (2013.01); *B62D 15/021* (2013.01)

(58) Field of Classification Search
CPC ......... B62D 5/046; B62D 6/00; B62D 15/021
USPC ........................................................... 701/41
See application file for complete search history.

(56) References Cited

U.S. PATENT DOCUMENTS

2020/0212792 A1* 7/2020 Westerweller ...... H02M 7/4835
2023/0135893 A1* 5/2023 Fujita .................. B62D 15/025 701/41
2023/0339534 A1* 10/2023 Sonoda .................. B62D 15/00
2024/0195333 A1* 6/2024 Skellenger ................ H02P 3/22
2024/0300571 A1* 9/2024 Jung .................... B62D 5/0481

FOREIGN PATENT DOCUMENTS

KR 10-0154380 B1 12/1998
KR 10-1694247 B1 1/2017
KR 10-1909068 B1 10/2018
KR 10-2021-0158569 A 12/2021

OTHER PUBLICATIONS

Korean Office Action issued on Aug. 4, 2026, in connection with the corresponding Korean Patent Application No. 10-2024-0100946, along with an English machine translation. (10 pages).

* cited by examiner

*Primary Examiner* — Yi-Kai Wang
(74) *Attorney, Agent, or Firm* — Hauptman Ham, LLP

(57) ABSTRACT

A motor-driven power steering device and a vehicle including the same are provided. More specifically, the motor-driven power steering device includes an overvoltage preventer blocking an overvoltage, which is generated as the signal line connecting the external sensor and the electronic control unit is shorted, from flowing to the external sensor or the electronic control unit to thereby prevent damage to electronic components due to a high voltage, a method for controlling the same, and a vehicle having the same.

18 Claims, 8 Drawing Sheets

MOTOR-DRIVEN POWER STEERING DEVICE, METHOD FOR CONTROLLING THE SAME, AND VEHICLE HAVING THE SAME

CROSS-REFERENCE TO RELATED APPLICATION

This application claims priority from Korean Patent Application No. 10-2024-0100946, filed on Jul. 30, 2024, which is hereby incorporated by reference for all purposes as if fully set forth herein.

BACKGROUND

Field

The present embodiments relate to a motor-driven power steering device that blocks a high voltage to an external sensor or an electronic control unit if a signal line connecting the external sensor and the electronic control unit is shorted to generate an overvoltage, a method for controlling the same, and a vehicle having the same.

Description of Related Art

Vehicle motor-driven power steering may refer to a device capable of changing a steering angle of a wheel based on a steering force (or rotational force) applied to a steering wheel by a driver.

Vehicle motor-driven power steering refers to a device for easing manipulation of the steering wheel. Recent vehicles come equipped with motor-driven power steering (MDPS) for changing the steering force depending on the driving velocity.

Motor-driven power steering functions to allowing the electronic control unit (ECU) to provide the optimal sense of steering to the driver while controlling the steering motor depending on the vehicle velocity.

Such motor-driven power steering is a device that assists manipulation of the steering wheel using power from the steering motor and includes a vehicle velocity sensor for detecting the velocity of the vehicle, a torque angle sensor for detecting whether the steering wheel is steered by the driver and the direction, an electronic control unit receiving information from, e.g., the vehicle velocity sensor and the torque angle sensor to control driving of the steering motor, and a steering motor transferring assist power to the rack bar connected to the wheels based on a control signal.

Accordingly, in motor-driven power steering, if an electrical signal is generated from each of the vehicle velocity sensor detecting the vehicle velocity and the torque angle sensor detecting a change in steering angle and is transferred to the electronic control unit, the electronic control unit controls driving of the steering motor and provides the optimal sense of steering to the driver.

In this case, motor-driven power steering includes an external sensor for transferring an electrical signal from the external sensor to the electronic control unit and a signal line for communication between the external sensor and the electronic control unit.

Here, if the signal line connecting the external sensor and the electronic control unit is shorted to generate an overvoltage, the overvoltage flows to the external sensor or the electronic control unit, damaging electronic components.

SUMMARY

The present embodiments may provide a motor-driven power steering device having an overvoltage preventer blocking an overvoltage, which is generated as the signal line connecting the external sensor and the electronic control unit is shorted, from flowing to the external sensor or the electronic control unit to thereby prevent damage to electronic components due to a high voltage, a method for controlling the same, and a vehicle having the same.

In an aspect, the present embodiments may provide a motor-driven power steering device, comprising an external sensor configured to detect a steering angle and a steering torque and output a sensor data signal, an electronic control unit configured to electronically control an operation of a steering motor in response to the sensor data signal, a signal line (SL) connecting the external sensor and the electronic control unit, and a first overvoltage preventer configured to block a high voltage from flowing to the electronic control unit when the signal line (SL) is shorted to generate an overvoltage.

In another aspect, the present embodiments may provide a vehicle, comprising a motor-driven power steering device configured to change a steering angle of a wheel, wherein the motor-driven power steering device comprising an external sensor configured to detect a steering angle and a steering torque and output a sensor data signal, an electronic control unit configured to electronically control an operation of a steering motor in response to the sensor data signal, a signal line (SL) connecting the external sensor and the electronic control unit, a first overvoltage preventer configured to block a high voltage from flowing to the electronic control unit when the signal line (SL) is shorted to generate an overvoltage, and a second overvoltage preventer configured to block a high voltage from flowing to the external sensor when the signal line (SL) is shorted to generate the overvoltage, and a power supply device configured to receive a voltage output from a power unit to generate and output a voltage supplied to the first overvoltage preventer and the second overvoltage preventer.

In another aspect, the present embodiments may provide a method for controlling a motor-driven power steering device, the method comprising detecting, by an external sensor, a steering angle and a steering torque and output a sensor data signal, electronically controlling, by an electronic control unit, an operation of a steering motor in response to the sensor data signal, and blocking, by a first overvoltage preventer, a high voltage from flowing to the electronic control unit when the signal line (SL) connecting the external sensor and the electronic control unit is shorted to generate an overvoltage.

According to the present embodiments, there may be provided a motor-driven power steering device having an overvoltage preventer blocking an overvoltage, which is generated as the signal line connecting the external sensor and the electronic control unit is shorted, from flowing to the external sensor or the electronic control unit to thereby prevent damage to electronic components due to a high voltage, a method for controlling the same, and a vehicle having the same.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION

Figure 1:
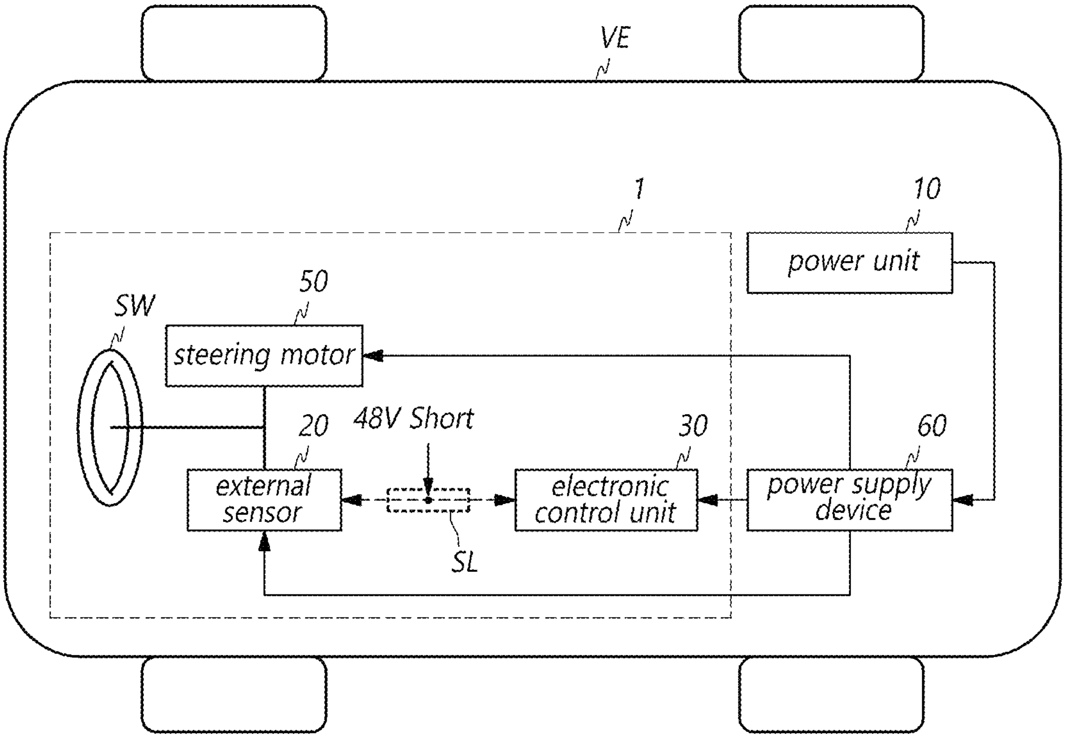
FIG. 1 is a block diagram illustrating a vehicle having a motor-driven power steering device according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Figure 2:
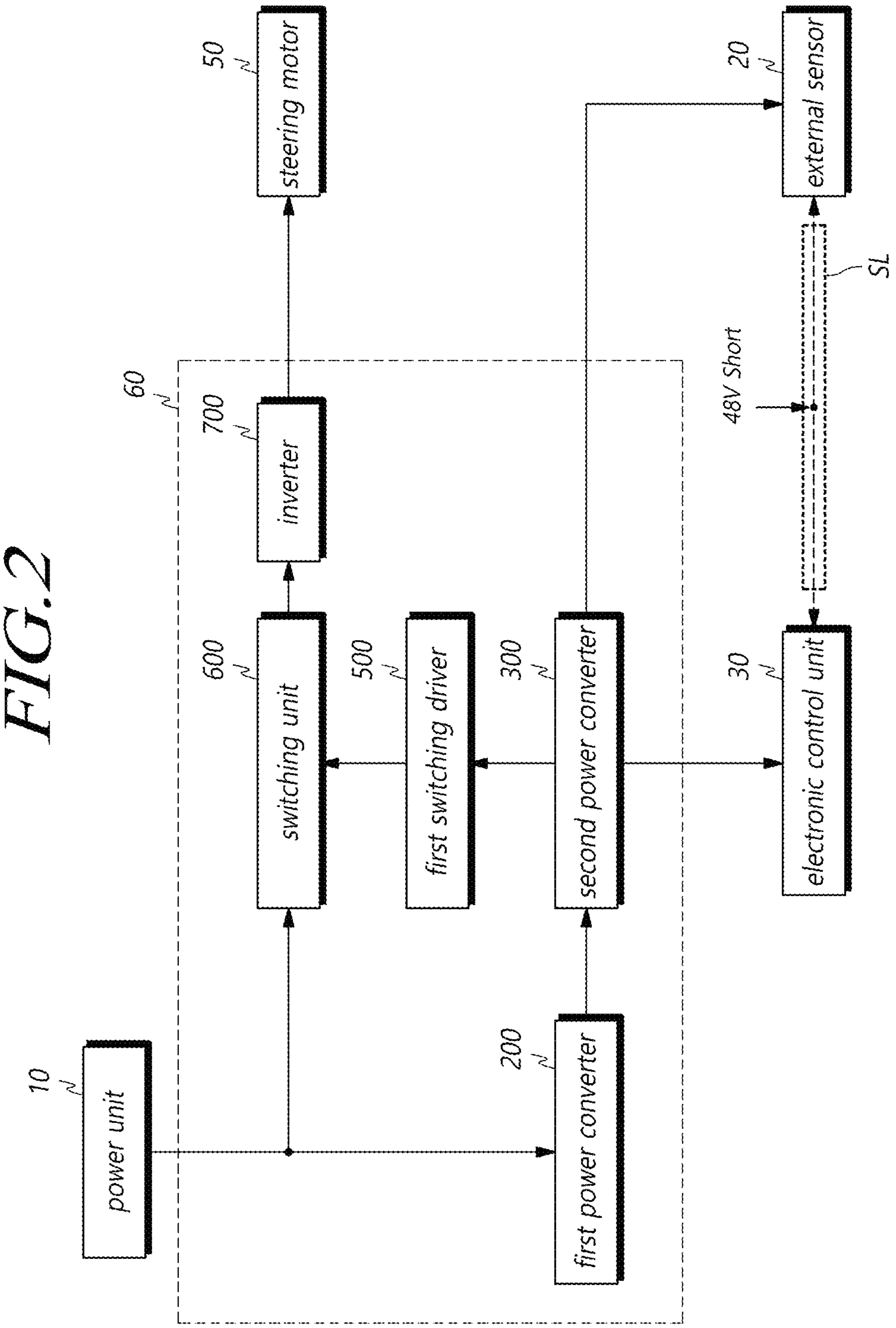
FIG. 2 is a block diagram illustrating a power supply device of a vehicle having a motor-driven power steering device according to the present embodiments.
Figure 3:
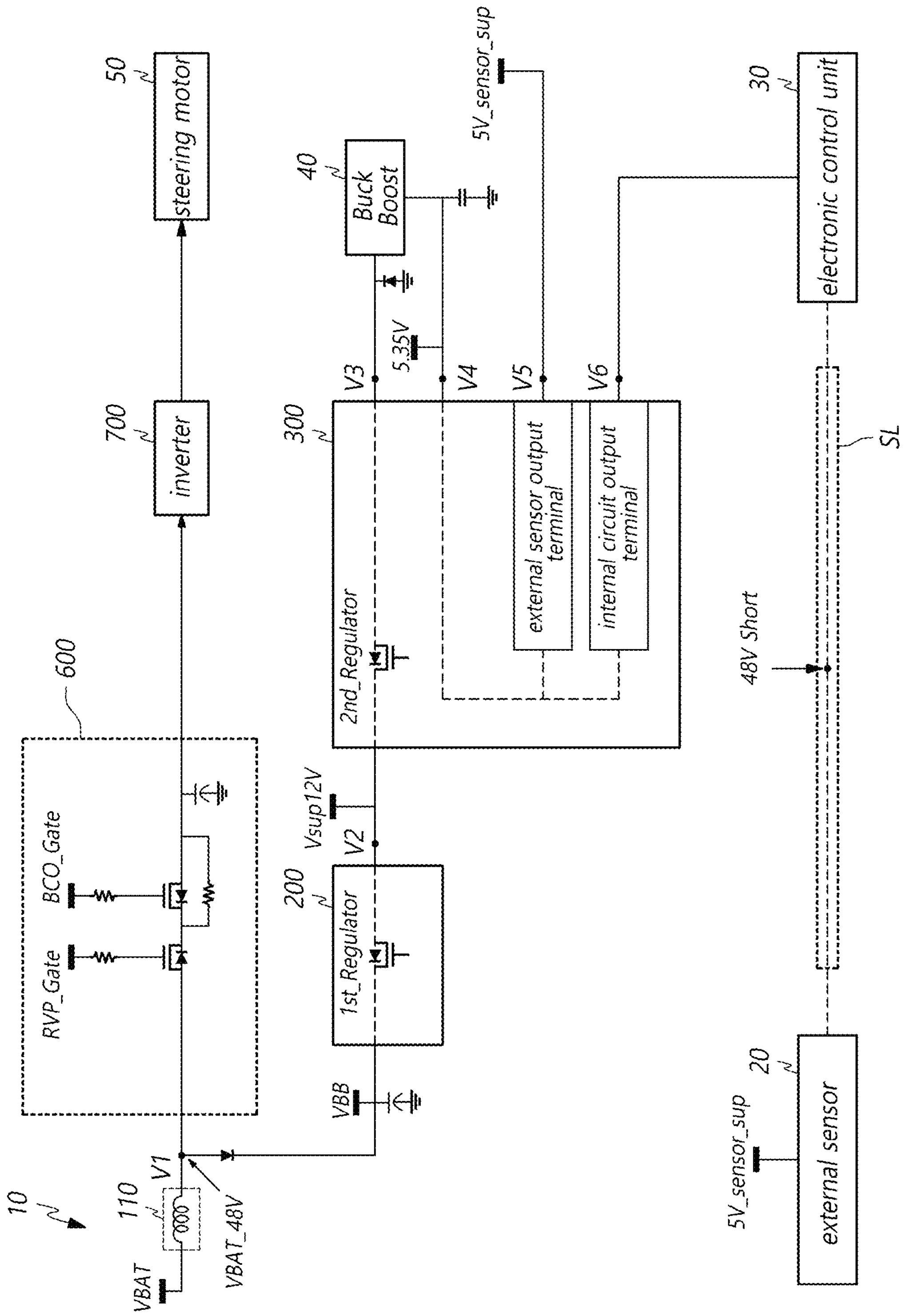
FIG. 3 is a view illustrating a detailed configuration of a motor-driven power steering device and a power supply device according to an embodiment.
Figure 4:
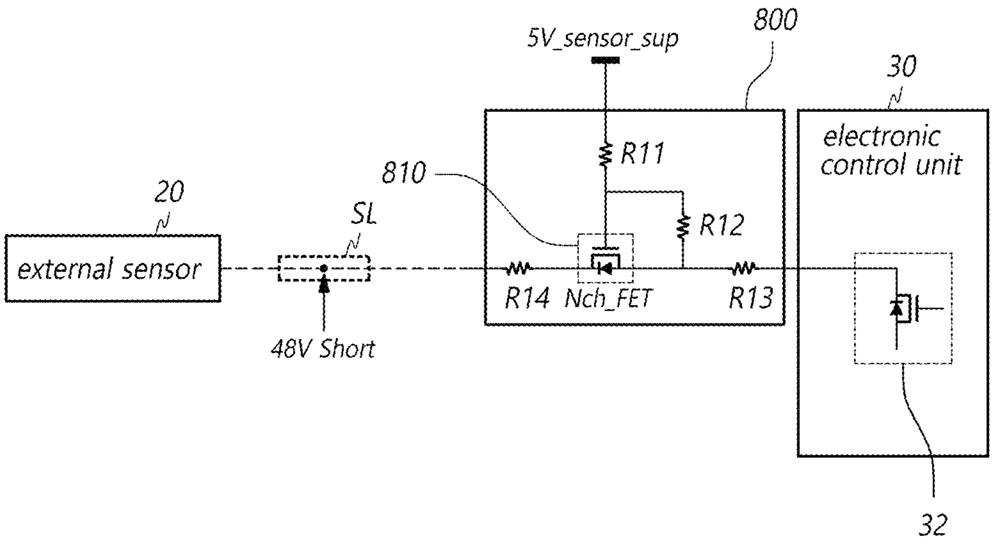
FIG. 4 is a circuit diagram illustrating a first overvoltage preventer of a motor-driven power steering device according to an embodiment.
Figure 5:
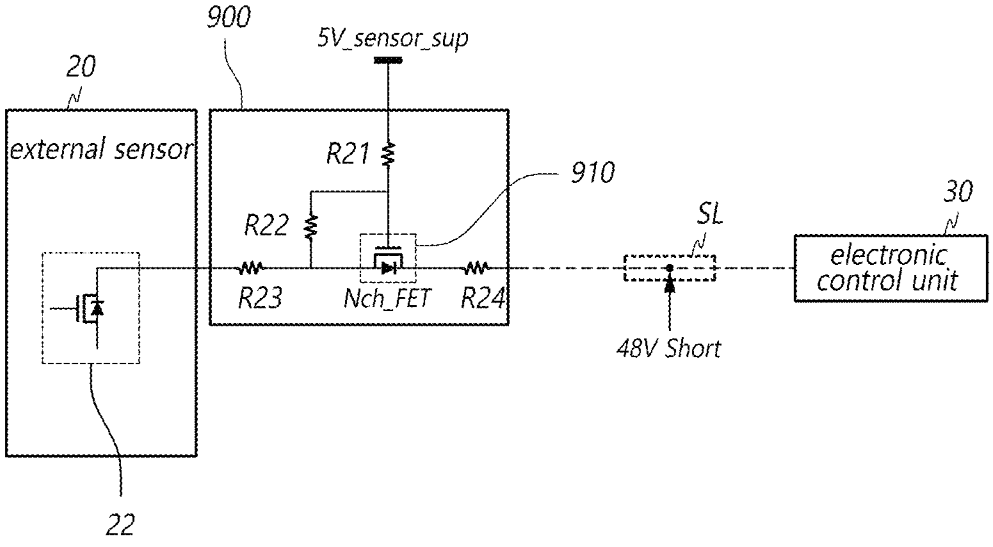
FIG. 5 is a circuit diagram illustrating a second overvoltage preventer of a motor-driven power steering device according to another embodiment.
Figure 6:
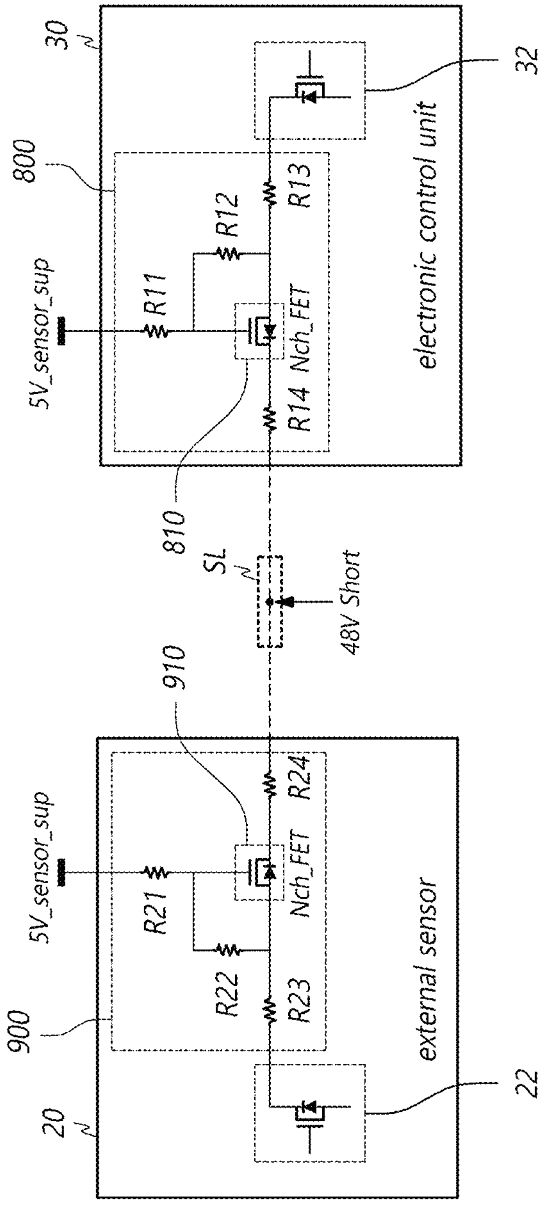
FIG. 6 is a circuit diagram illustrating a first overvoltage preventer and a second overvoltage preventer of a motor-driven power steering device according to another embodiment.
Figure 7:
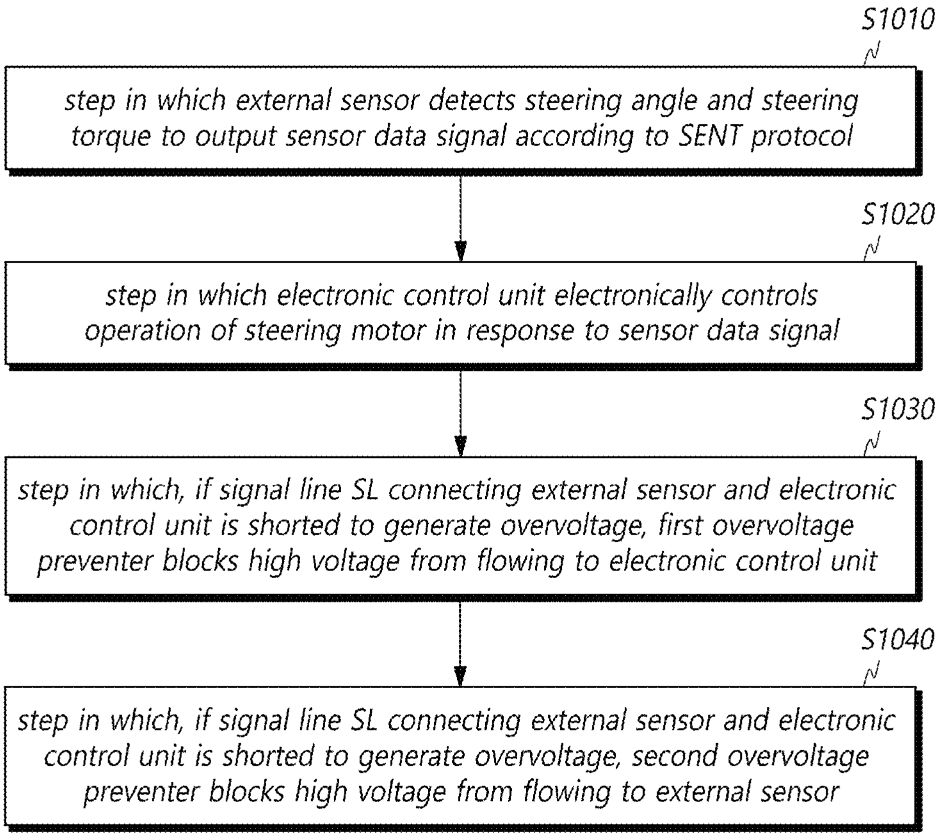
FIG. 7 is a flowchart illustrating a method for controlling a motor-driven power steering device.
Figure 8:
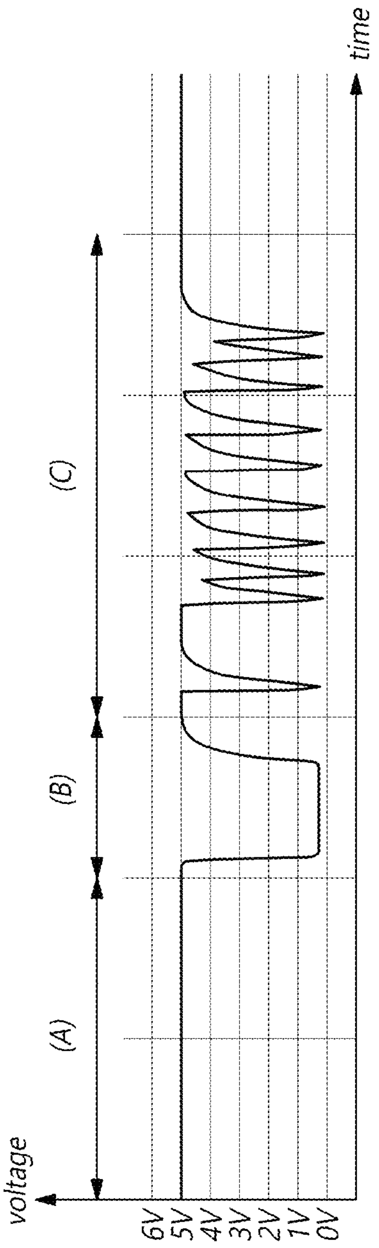
FIG. 8 is a graph illustrating an operation voltage of an SPC SENT I/F.

FIG. 1 is a block diagram illustrating a vehicle having a motor-driven power steering device according to the present embodiments. FIG. 2 is a block diagram illustrating a power supply device of a vehicle having a motor-driven power steering device according to the present embodiments. FIG. 3 is a view illustrating a detailed configuration of a motor-driven power steering device and a power supply device according to an embodiment. FIG. 4 is a circuit diagram illustrating a first overvoltage preventer of a motor-driven power steering device according to an embodiment. FIG. 5 is a circuit diagram illustrating a second overvoltage preventer of a motor-driven power steering device according to another embodiment. FIG. 6 is a circuit diagram illustrating a first overvoltage preventer and a second overvoltage preventer of a motor-driven power steering device according to another embodiment. FIG. 7 is a flowchart illustrating a method for controlling a motor-driven power steering device. FIG. 8 is a graph illustrating an operation voltage of an SPC SENT I/F.

A vehicle according to the present embodiments may include a power unit 10, an external sensor 20, an electronic control unit 30, a steering motor 50, a power supply device 60, and a signal line SL.

Referring to FIG. 1, a vehicle VE may include a power unit 10 providing a direct current (DC) voltage, an external sensor 20 including a torque sensor and an angle sensor, an electronic control unit 30 electronically controlling the operation of the steering motor 50 in response to a signal from the external sensor 20, a signal line SL connecting the external sensor 20 and the electronic control unit 30, and a power supply device 60 receiving a voltage output from the power unit 10 and generating and outputting a voltage supplied to the external sensor 20, the electronic control unit 30, and the steering motor 50.

The power unit 10 may include a power source of at least one of a direct current (DC) voltage and an alternating current (AC) voltage.

The external sensor 20 may include a torque sensor measuring a twisting force applied to a rotating component such as the steering wheel SW of the vehicle and an angle sensor measuring the position or rotating angle of the rotating component such as the steering wheel SW.

The electronic control unit 30 may electronically control the operation of the steering motor 50 in response to a signal of the external sensor 20.

The power supply device 60 may receive the voltage output from the power unit 10 and generate and output the voltage supplied to the external sensor 20, the electronic control unit 30, and the steering motor 50. A power supply device 60 may receive a voltage output from a power unit 10 to generate and output a voltage supplied to a first overvoltage preventer 800 and a second overvoltage preventer 900.

Referring to FIGS. 2 and 3, the power supply device 60 may include a power unit 60, a first power converter 200, a second power converter 300, a first switching driver 500, a switching unit 600, and an inverter 700.

In an aspect, a power supply device 60 may include a first power converter 200 configured to receive, modulate, and frequency-convert a first voltage V1 output from the power unit 10 to generate and output a second voltage V2 lower than the first voltage V1, a second power converter 300 configured to receive and frequency-convert the second voltage V2 output from the first power converter 200 to output a third voltage V3 lower than the second voltage V2 and receive a fourth voltage V4 boosted from the third voltage V3 to generate and output a fifth voltage V5 supplied to the first overvoltage preventer, the second overvoltage preventer, and the external sensor 20 and a sixth voltage V6 supplied to the electronic control unit 30, as a voltage lower than the fourth voltage V4, a first switching driver 500 configured to be connected to the second power converter 300 and receiving a voltage output from the second power converter 300, and a switching unit 600 configured to be positioned between the power unit 10 and the inverter 700 or the motor 10 to switch the connection between the power unit 10 and the inverter 700 or the motor 10 based on a voltage output from the first switching driver 500.

The power unit 10 may include a power source of at least one of direct current (DC) voltage and alternating current (AC) voltage, and may supply the first voltage V1 to the first power converter 200 and the inverter 700.

Here, the first voltage V1 may be a DC voltage, and the DC voltage may be battery power.

In this case, the first voltage V1 is not limited thereto, and may include any power source that may supply DC voltage.

For example, the power unit 10 may generate and output a 48V DC voltage as the first voltage V1 in the battery.

A filter 110 may receive the battery voltage of the power unit 10 and filter the battery voltage to output the filtered first voltage V1.

Here, the filter 110 may include reactors, capacitors, and the like.

The first power converter 200 may receive and modulate the first voltage V1 output from the power unit 10, and convert the frequency to generate and output a second voltage V2 lower than the first voltage V1.

The first power converter 200 may be connected to the power unit 10 and may receive a first voltage V1 output from the power unit 10.

In this case, the first power converter 200 may receive a DC voltage from the power unit 10.

The first power converter 200 may modulate the first voltage V1 supplied from the power unit 10 and convert the frequency to generate a second voltage V2 lower than the first voltage V1.

More specifically, the first power converter 200 may modulate the DC voltage, which is the first voltage V1 supplied from the power unit 10, into a pulse wave, and convert the frequency to generate and output the second voltage V2 lower than the first voltage V1.

Here, the pulse wave may include a positive pulse wave.

The first power converter 200 may include a DC-DC converter. For example, the first power converter 200 may include a buck converter and a boost converter, but is not limited thereto, and may include any converter that may drop the received DC voltage into a DC voltage lower than the received DC voltage.

The first power converter 200 according to the present embodiments may include a buck converter that modulates the first voltage V1 output as a DC voltage into a positive pulse wave and converts into the second voltage V2 lower than the first voltage V1 through a switching-type regulator.

In other words, the buck converter may modulate the DC voltage supplied from the power unit 10 to a positive pulse wave through the switching-type regulator, and convert the frequency to generate and output the second voltage V2 lower than the first voltage V1.

For example, the first power converter 200 may modulate the 48V DC voltage, which is the first voltage V1 supplied from the power unit 10, into a pulse wave, convert the frequency, and generate and output a 12V DC voltage, as the second voltage V2, lower than the first voltage V1.

In this case, the first power converter 200 may be configured to generate and output the second voltage V2 within a preset voltage range, and may be configured to generate and output a DC voltage of 20 V or less as the second voltage V2. The preset voltage range may be set as a voltage range larger than 10V and smaller than 18V.

The second power converter 300 may receive the second voltage V2 output from the first power converter 200 and convert the frequency to output a third voltage V3 lower than the second voltage V2 and receive a fourth voltage V4 boosted from the third voltage V3 to generate and output a fifth voltage V5 and a sixth voltage V6 lower than the fourth voltage V4.

The second power converter 300 may be connected to the first power converter 200 and may receive the second voltage V2 output from the first power converter 200.

In this case, the second power converter 300 may receive the second voltage V2 modulated into a positive pulse wave from the first power converter 200.

The second power converter 300 may convert the frequency of the second voltage V2 supplied from the first power converter 200 to generate a third voltage V3 lower than the second voltage V2.

Further, the second power converter 300 may receive the fourth voltage V4 boosted from the third voltage V3 to generate the fifth voltage V5 and the sixth voltage V6 lower than the fourth voltage V4.

In this case, the second power converter 300 may convert the frequency of the second voltage V2 supplied from the first power converter 200 to generate the fifth voltage V5 and the sixth voltage V6 lower than the second voltage V2.

The second power converter 300 may include a DC-DC converter. For example, the second power converter 300 may include a buck converter and a boost converter, but is not limited thereto, and may include any converter that may drop the received DC voltage into a DC voltage lower than the received DC voltage or boost the decreased DC voltage into a higher DC voltage.

The second power converter 300 according to the present embodiments may include a buck converter converting the second voltage V2 output as a DC voltage to a third voltage V3 lower than the second voltage V2 through a switching-type regulator.

Further, the present embodiments may further include a boost converter converting the third voltage V3 output as a DC voltage to a fourth voltage V4 lower than the second voltage V2 and higher than the third voltage V3 through a switching-type regulator.

In other words, the buck converter may convert the frequency of the second voltage V2 modulated into a positive pulse wave in the first power converter 200 and generate and output the third voltage V3 lower than the second voltage V2.

The boost converter 40 may generate and output the fourth voltage V4 lower than the second voltage V2 and higher than the third voltage V3 using the generated third voltage V3.

For example, the second power converter 300 may drop the 12V DC voltage, which is the second voltage V2 supplied from the first power converter 200, and generate and output a 5V or 3.3V DC voltage lower than the second voltage V2 as the third voltage V3.

The boost converter 40 may boost the DC voltage of 5V or 3.3V, which is the generated third voltage V3, and generate and output the DC voltage of 5.35V, which is lower than the second voltage V2 and higher than the third voltage V3, as the fourth voltage V4.

The second power converter 300 may receive the fourth voltage V4 boosted from the third voltage V3 to generate and output a DC voltage of 5V lower than the 5.35V direct voltage which is the fourth voltage V4, as the fifth voltage V5, and receive the fourth voltage V4 boosted from the third voltage V3 to generate and output a DC voltage of 5V or 3.3V lower than the 5.35V direct voltage which is the fourth voltage V4, as the sixth voltage V6.

In this case, the second power converter 300 may drop the 12V DC voltage which is the second voltage V2 received from the first power converter 200 and generate and output the 5V DC voltage lower than the second voltage V2 as the fifth voltage V5, and drop the 12 DC voltage which is the second voltage V2 received from the first power converter 200 and generate and output the 5V or 3.3V DC voltage lower than the second voltage V2 as the sixth voltage V6.

The external sensor 20 may receive the fifth voltage V5 output from the second power converter 300 to operate.

The external sensor 20 may be connected to an external sensor output terminal of the second power converter 300 and may receive the fifth voltage V5 output from the second power converter 300 to operate.

For example, the external sensor 20 may receive a DC voltage of 5V, which is the fifth voltage V5 generated by the second power converter 300, to operate.

Here, the external sensor 20 may detect the steering angle and the steering torque and output a sensor data signal according to a single edge nibble transmission (SENT) protocol.

The electronic control unit 30 may receive the sixth voltage V6 output from the second power converter 300 to operate.

The electronic control unit 30 may be connected to an internal circuit output terminal of the second power converter 300 and may receive the sixth voltage V6 output from the second power converter 300 to operate.

For example, the electronic control unit 30 may receive a DC voltage of 5V or 3.3V, which is the sixth voltage V6 generated by the second power converter 300, to operate.

Here, the electronic control unit 30 may be connected to the external sensor 20, the first power converter 200, the second power converter 300, the first switching driver 500, and the inverter 700 to control and monitor their operations.

For example, the electronic control unit 30 may electronically control the operation of the steering motor 50 through the inverter 700 in response to a sensor data signal of the external sensor 20.

Further, the electronic control unit 30 may detect at least one of the operation state of the inverter 700 and the operation state of the motor 10, generate a control signal according to the detection result, and output the control signal to the first switching driver 500.

The switching unit 600 may be positioned between the power unit 10 and the inverter 700 or the motor 10, and may control the connection between the power unit 10 and the inverter 700 or the motor 10 based on the voltage output from the first switching driver 500.

The switching unit 600 may include an input terminal, an output terminal, and a control terminal.

Here, the input terminal may be connected to the power unit 10, the output terminal may be connected to the inverter 700 or the motor 10, and the control terminal may be connected to the first switching driver 500.

For example, as the control terminal voltage is larger than the threshold voltage, the switching unit 600 may supply the first voltage V1 output from the power unit 10 to the inverter 700.

In other words, when the voltage at the gate terminal is greater than the voltage at the input terminal, the input terminal and the output terminal of the switching unit 600 may be connected to each other to supply the first voltage V1 output from the power unit 10 to the inverter 700.

The inverter 700 may be positioned between the switching unit 600 and the motor 10, and may convert the voltage output and supplied from the switching unit 600 and supply the converted voltage to the motor 10.

The inverter 700 may include any converter that may receive a DC voltage from a DC-AC converter and convert the DC voltage into an AC voltage.

Here, the motor 10 may be a steering motor 50 included in the steering device of the vehicle.

A motor-driven power steering device according to an embodiment may include an external sensor 20 configured to detect a steering angle and a steering torque and output a sensor data signal according to a single edge nibble transmission (SENT) protocol, an electronic control unit 30 configured to electronically control an operation of a steering motor 50 in response to the sensor data signal, a signal line SL connecting the external sensor 20 and the electronic control unit 30, and a first overvoltage preventer 800 configured to block a high voltage from flowing to the electronic control unit 30 when the signal line SL is shorted to generate an overvoltage.

The motor-driven power steering device 1 is a device that assists the manipulation force of the steering wheel SW using power from the steering motor 50 and may include a vehicle velocity sensor for detecting the velocity of the vehicle VE, a torque angle sensor for detecting whether the steering wheel SW is steered by the driver and the direction, an electronic control unit 30 receiving information from, e.g., the vehicle velocity sensor and the torque angle sensor to control driving of the steering motor 50, and the steering motor 50 transferring assist power to the rack bar connected to the wheels based on a control signal.

In other words, in the motor-driven power steering device 1, if an electrical signal is generated from the external sensor 20 including the vehicle velocity sensor for detecting the velocity of the vehicle and the torque angle sensor for detecting a change in steering angle and is transferred to the electronic control unit 30, the electronic control unit 30 may control driving of the steering motor 50, providing the user with the optimal sense of steering.

In this case, the motor-driven power steering device 1 may include a signal line SL for communication between the electronic control unit 30 and the external sensor 20 to transfer the electrical signal from the external sensor 20 to the electronic control unit 30.

Here, the motor-driven power steering device 1 may include a first overvoltage preventer 800 and a second overvoltage preventer 900 to prevent a high voltage of 48V from flowing to the external sensor 20 or the electronic control unit 30 if the signal line SL connecting the external sensor 20 and the electronic control unit 30 is shorted to generate an overvoltage.

As shown in FIG. 4, the first overvoltage preventer 800 may be disposed between the electronic control unit 30 and the signal line SL.

The first overvoltage preventer 800 may include a first switching element 810, the first switching element is configured to be turned on, in response to a voltage output from an external sensor output terminal of the power supply device 60 being a preset reference voltage or more, to enable signal transmission/reception between the external sensor 20 and the electronic control unit 30, and the first switching element is configured to, when the signal line SL is shorted to generate the overvoltage, block the high voltage of 48V from flowing to the electronic control unit 30.

In this case, the first switching element 810 may be a field effect transistor that is configured to be turned on in response to the voltage output from the external sensor output terminal being the preset reference voltage or more and is configured to be turned off in response to the signal line SL being shorted to generate the overvoltage.

Further, the first overvoltage preventer 800 according to an embodiment may include a first resistor R11 positioned between the external sensor output terminal and the gate terminal of the first switching element 810 and a second resistor R12 positioned between the gate terminal of the first switching element 810 and the source terminal of the first switching element 810.

Further, the first overvoltage preventer 800 according to an embodiment may include a third resistor R13 positioned between the electronic control unit 30 and the source terminal of the first switching element 810 to remove or reduce noise to maintain integrity of a signal during signal transmission and a fourth resistor R14 positioned between the signal line SL and the drain terminal of the first switching element 810 to remove or reduce noise to maintain integrity of a signal during signal transmission.

Here, the first overvoltage preventer 800 is configured to set a resistance ratio of the first resistor R11, the second resistor R12, and the third resistor R13 so that the first switching element 810 maintains a turn-on state in which signal transmission/reception between the external sensor 20 and the electronic control unit 30 is possible when a voltage output from the external sensor output terminal is supplied to the gate terminal of the first switching element 810, and the first switching element 810 maintains a turn-off state when the signal line SL is shorted to generate the overvoltage.

For example, the first resistor R11 may have a resistance of 120Ω, the second resistor R12 may have a resistance of 4.7 KΩ, and the third resistor R13 may have a resistance of 120Ω.

Accordingly, if the voltage output from the external sensor output terminal is supplied to the gate terminal of the first switching element 810, the first overvoltage preventer 800 may maintain the turn-on state and enables signal transmission/reception between the external sensor 20 and the electronic control unit 30 without an FET body diode forward voltage drop.

In contrast, if the signal line SL is shorted to generate an overvoltage, the first switching element 810 may not maintain the VGS voltage and is thus turned off, blocking an overcurrent from flowing to the electronic control unit 30.

As such, in the motor-driven power steering device 1 according to an embodiment, if the signal line SL is shorted to generate an overvoltage, the first overvoltage preventer 800 may block a high voltage of 48V from flowing to the electronic control unit 30, preventing damage to the electronic control unit 30.

The motor-driven power steering device 1 according to another embodiment may further include a second overvoltage preventer 900 configured to block a high voltage from flowing to the external sensor 20 when the signal line SL is shorted to generate an overvoltage.

As shown in FIG. 5, the second overvoltage preventer 900 may be disposed between the external sensor 20 and the signal line SL.

The second overvoltage preventer 900 may include a second switching element 910, the second switching element is configured to be turned on, in response to a voltage output from an external sensor output terminal being a preset reference voltage or more, to enable signal transmission/reception between the external sensor 20 and the electronic control unit 30, and the second switching element is configured to, when the signal line SL is shorted to generate the overvoltage, block the high voltage of 48V from flowing to the external sensor 20.

In this case, the second switching element 910 may be a field effect transistor that is configured to be turned on if the voltage output from the external sensor output terminal being the preset reference voltage or more and is configured to be turned off in response to the signal line SL being shorted to generate the overvoltage.

Further, the second overvoltage preventer 800 according to another embodiment may include a fifth resistor R21 positioned between the external sensor output terminal and the gate terminal of the second switching element 910 and a sixth resistor R22 positioned between the gate terminal of the second switching element 910 and the source terminal of the second switching element 910.

Further, the second overvoltage preventer 900 according to another embodiment may include a seventh resistor R23 positioned between the electronic control unit 30 and the source terminal of the second switching element 910 to remove or reduce noise to maintain integrity of a signal during signal transmission and an eighth resistor R24 positioned between the signal line SL and the drain terminal of the second switching element 910 to remove or reduce noise to maintain integrity of a signal during signal transmission.

Here, the second overvoltage preventer 900 is configured to set a resistance ratio of the fifth resistor R21, the sixth resistor R22, and the seventh resistor R23 so that the second switching element 910 maintains a turn-on state in which signal transmission/reception between the external sensor 20 and the electronic control unit 30 is possible when a voltage output from the external sensor output terminal is supplied to the gate terminal of the second switching element 910, and the second switching element 910 maintains a turn-off state when the signal line SL is shorted to generate the overvoltage.

For example, the fifth resistor R21 may have a resistance of 120Ω, the sixth resistor R22 may have a resistance of 4.7 KΩ, and the seventh resistor R23 may have a resistance of 120Ω.

Accordingly, if the voltage output from the external sensor output terminal is supplied to the gate terminal of the second switching element 910, the second overvoltage preventer 900 may maintain the turn-on state and enables signal transmission/reception between the external sensor 20 and the electronic control unit 30 without an FET body diode forward voltage drop.

In contrast, if the signal line SL is shorted to generate an overvoltage, the second switching element 910 may not maintain the VGS voltage and is thus turned off, blocking an overcurrent from flowing to the external sensor 20.

As such, in the motor-driven power steering device 1 according to another embodiment, if the signal line SL is shorted to generate an overvoltage, the second overvoltage preventer 900 may block a high voltage of 48V from flowing to the external sensor 20, preventing damage to the external sensor 20.

In another embodiment, the motor-driven power steering device 1 may have a first overvoltage preventer 800, which blocks a high voltage of 48V from flowing to the electronic control unit 30 if the signal line SL is shorted to generate an overvoltage, and a second overvoltage preventer 900, which blocks a high voltage of 48V from flowing to the external sensor 20 if the signal line SL is shorted to generate an overvoltage, between the electronic control unit 30 and the signal line SL and between the external sensor 20 and the signal line SL, respectively.

Here, as shown in FIG. 6, in the motor-driven power steering device 1, the electronic control unit 30 may include the first overvoltage preventer 800, and the external sensor 20 may include the second overvoltage preventer 900.

In another aspect, a method for controlling a motor-driven power steering device, the method include detecting, by an external sensor 20, a steering angle and a steering torque and output a sensor data signal according to a single edge nibble transmission (SENT) protocol (S1010), electronically controlling, by an electronic control unit 30, an operation of a steering motor 50 in response to the sensor data signal (S1020), blocking, by a first overvoltage preventer 800, a high voltage from flowing to the electronic control unit 30 when the signal line SL connecting the external sensor 20 and the electronic control unit 30 is shorted to generate an overvoltage (S1030), and blocking, by a second overvoltage preventer 900, a high voltage from flowing to the external sensor 20 when the signal line SL connecting the external sensor 20 and the electronic control unit 30 is shorted to generate the overvoltage (S1040).

Operations of a short PWM code (SPC) single edge nibble transmission (SENT) are described with reference to FIG. 8. As shown in section (A), the serial enhanced nibble transmission interface (SENT I/F) normally maintains a pull-up state of a 5V level.

Here, when the active low switch 22 of the external sensor 20 is turned off, a pull up state of 5V may be maintained and, when the active low switch 22 of the external sensor 20 is turned on, the switching element is in the turn-on state, and the voltage between the drain terminal and source terminal of the switching element is maintained as 0V.

When the active low switch 32 of the electronic control unit 30 is turned off, a pull up state of 5V may be maintained and, when the active low switch 32 of the electronic control unit 30 is turned on, the switching element is in the turn-on state, and the voltage between the drain terminal and source terminal of the switching element is maintained as 0V.

As shown in section (B), the electronic control unit 30 performs an open drain output active low trigger operation.

In this case, if the SPC SENT I/F voltage meets a voltage of 1V or less with respect to the connector terminal in section (B), as shown in section (C), the external sensor 20 transmits a SENT signal in the form of an open drain active low output, and the electronic control unit 30 receives the SENT signal. After the electronic control unit 30 receives the SENT signal, the external sensor 20 detects the steering angle and steering torque and outputs a sensor data signal according to the single edge nibble transmission (SENT) protocol (S1010).

The electronic control unit 30 electrically controls the operation of the steering motor 50 in response to the sensor data signal.

In this case, if the signal line SL connecting the external sensor 20 and the electronic control unit 30 is shorted to generate an overvoltage, the first overvoltage preventer 800 blocks a high voltage from flowing to the electronic control unit 30 (S1030), and the second overvoltage preventer 900 blocks a high voltage from flowing to the external sensor 20 (S1040).

In other words, if the signal line SL is shorted to generate an overvoltage, the first overvoltage preventer 800 blocks a high voltage of 12V to 48V from flowing to the electronic control unit 30, and the second overvoltage preventer 900 blocks a high voltage of 12V to 48V from flowing to the external sensor 20.

As described above, according to the present embodiments, it is possible to block an overvoltage, which is generated as the signal line SL connecting the external sensor 20 and the electronic control unit 30 is shorted, from flowing to the external sensor 20 or the electronic control unit 30 to thereby prevent damage to electronic components due to a high voltage and to secure steering stability.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A motor-driven power steering device, comprising:

an external sensor configured to detect a steering angle and a steering torque and output a sensor data signal;

an electronic control unit configured to electronically control an operation of a steering motor in response to the sensor data signal;

a signal line (SL) connecting the external sensor and the electronic control unit;

a first overvoltage preventer configured to block a high voltage from flowing to the electronic control unit when the signal line (SL) is shorted to generate an overvoltage; and a second overvoltage preventer configured to block a high voltage from flowing to the external sensor when the signal line (SL) is shorted to generate the overvoltage.

2. The motor-driven power steering device of claim 1, wherein the first overvoltage preventer includes a first switching element, the first switching element is configured to be turned on, in response to a voltage output from an external sensor output terminal of a power supply device being a preset reference voltage or more, to enable signal transmission/reception between the external sensor and the electronic control unit, and the first switching element is configured to, when the signal line (SL) is shorted to generate the overvoltage, block the high voltage from flowing to the electronic control unit.

3. The motor-driven power steering device of claim 2, wherein the first switching element is a field effect transistor (FET) that is configured to be turned on in response to the voltage output from the external sensor output terminal being the preset reference voltage or more and is configured to be turned off in response to the signal line (SL) being shorted to generate the overvoltage.

4. The motor-driven power steering device of claim 2, wherein the first overvoltage preventer includes:

a first resistor positioned between the external sensor output terminal and a gate terminal of the first switching element; and a second resistor positioned between the gate terminal of the first switching element and a source terminal of the first switching element.

5. The motor-driven power steering device of claim 4, wherein the first overvoltage preventer further includes a third resistor positioned between the electronic control unit and the source terminal of the first switching element and configured to remove or reduce noise to maintain integrity of a signal during signal transmission.

6. The motor-driven power steering device of claim 5, wherein the first overvoltage preventer is configured to set a resistance ratio of the first resistor, the second resistor, and the third resistor so that the first switching element maintains a turn-on state in which signal transmission/reception between the external sensor and the electronic control unit is possible when a voltage output from the external sensor output terminal is supplied to the gate terminal of the first switching element, and the first switching element maintains a turn-off state when the signal line (SL) is shorted to generate the overvoltage.

7. The motor-driven power steering device of claim 4, wherein the first overvoltage preventer further includes a fourth resistor positioned between the signal line (SL) and a drain terminal of the first switching element and configured to remove or reduce noise to maintain integrity of a signal during signal transmission.

8. The motor-driven power steering device of claim 1, wherein the second overvoltage preventer includes a second switching element, the second switching element is configured to be turned on, in response to a voltage output from an external sensor output terminal being a preset reference voltage or more, to enable signal transmission/reception between the external sensor and the electronic control unit, and the second switching element is configured to, when the signal line (SL) is shorted to generate the overvoltage, block the high voltage from flowing to the external sensor.

9. The motor-driven power steering device of claim 8, wherein the second switching element is a field effect transistor (FET) that is configured to be turned on in response to the voltage output from the external sensor output terminal being the preset reference voltage or more and is configured to be turned off in response to the signal line (SL) being shorted to generate the overvoltage.

10. The motor-driven power steering device of claim 8, wherein the second overvoltage preventer includes:

a fifth resistor positioned between the external sensor output terminal and a gate terminal of the second switching element; and a sixth resistor positioned between the gate terminal of the second switching element and a source terminal of the second switching element.

11. The motor-driven power steering device of claim 10, wherein the second overvoltage preventer further includes a seventh resistor positioned between the electronic control unit and the source terminal of the second switching element and configured to remove or reduce noise to maintain integrity of a signal during signal transmission.

12. The motor-driven power steering device of claim 11, wherein the second overvoltage preventer is configured to set a resistance ratio of the fifth resistor, the sixth resistor, and the seventh resistor so that the second switching element maintains a turn-on state in which signal transmission/reception between the external sensor and the electronic control unit is possible when a voltage output from the external sensor output terminal is supplied to the gate terminal of the second switching element, and the second switching element maintains a turn-off state when the signal line (SL) is shorted to generate the overvoltage.

13. The motor-driven power steering device of claim 10, wherein the second overvoltage preventer further includes an eighth resistor positioned between the signal line (SL) and a drain terminal of the second switching element and configured to remove or reduce noise to maintain integrity of a signal during signal transmission.

14. A method for controlling a motor-driven power steering device, the method comprising:

detecting, by an external sensor, a steering angle and a steering torque and output a sensor data signal;

electronically controlling, by an electronic control unit, an operation of a steering motor in response to the sensor data signal;

blocking, by a first overvoltage preventer, a high voltage from flowing to the electronic control unit when a signal line (SL) connecting the external sensor and the electronic control unit is shorted to generate an overvoltage; and blocking, by a second overvoltage preventer, a high voltage from flowing to the external sensor when the signal line (SL) connecting the external sensor and the electronic control unit is shorted to generate the overvoltage.

15. A vehicle, comprising:

a motor-driven power steering device configured to change a steering angle of a wheel, wherein the motor-driven power steering device comprising:

an external sensor configured to detect a steering angle and a steering torque and output a sensor data signal;

an electronic control unit configured to electronically control an operation of a steering motor in response to the sensor data signal;

a signal line (SL) connecting the external sensor and the electronic control unit;

a first overvoltage preventer configured to block a high voltage from flowing to the electronic control unit when the signal line (SL) is shorted to generate an overvoltage; and a second overvoltage preventer configured to block a high voltage from flowing to the external sensor when the signal line (SL) is shorted to generate the overvoltage; and a power supply device configured to receive a voltage output from a power unit to generate and output a voltage supplied to the first overvoltage preventer and the second overvoltage preventer.

16. The vehicle of claim 15, wherein the power supply device includes:

a first power converter configured to receive, modulate, and frequency-convert a first voltage output from the power unit to generate and output a second voltage lower than the first voltage; and a second power converter configured to:

receive and frequency-convert the second voltage output from the first power converter to output a third voltage lower than the second voltage; and receive a fourth voltage boosted from the third voltage to generate and output a fifth voltage supplied to the first overvoltage preventer, the second overvoltage preventer, and the external sensor and a sixth voltage supplied to the electronic control unit, as a voltage lower than the fourth voltage.

17. The vehicle of claim 15, wherein the first overvoltage preventer includes a first switching element, the first switching element is configured to be turned on, in response to a voltage output from an external sensor output terminal being a preset reference voltage or more, to enable signal transmission/reception between the external sensor and the electronic control unit, and the first switching element is configured to, when the signal line (SL) is shorted to generate the overvoltage, block the high voltage from flowing to the electronic control unit.

18. The vehicle of claim 15, wherein the second overvoltage preventer includes a second switching element, the second switching element is configured to be turned on, in response to a voltage output from an external sensor output terminal being a preset reference voltage or more, to enable signal transmission/reception between the external sensor and the electronic control unit, and the second switching element is configured to, when the signal line (SL) is shorted to generate the overvoltage, block the high voltage from flowing to the external sensor.

* * * * *